(12) United States Patent
Hough

(10) Patent No.: US 10,486,388 B2
(45) Date of Patent: Nov. 26, 2019

(54) GYPSUM FIBER ROOF PANEL WITH ANGLED EDGE FOR ACCOMMODATING ENVIRONMENTALLY-INDUCED EXPANSION

(71) Applicant: UNITED STATES GYPSUM COMPANY, Chicago, IL (US)

(72) Inventor: Michael J. Hough, Beach Park, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 19 days.

(21) Appl. No.: 15/878,098

(22) Filed: Jan. 23, 2018

(65) Prior Publication Data

US 2018/0281337 A1 Oct. 4, 2018

Related U.S. Application Data

(60) Provisional application No. 62/478,865, filed on Mar. 30, 2017.

(51) Int. Cl.

| | |
|---|---|
| *B32B 3/02* | (2006.01) |
| *E04C 2/04* | (2006.01) |
| *E04C 2/30* | (2006.01) |
| *E04C 2/06* | (2006.01) |
| *B32B 18/00* | (2006.01) |
| *B28B 19/00* | (2006.01) |
| *C04B 28/14* | (2006.01) |

(Continued)

(52) U.S. Cl.
CPC ............ *B32B 3/02* (2013.01); *B28B 19/0092* (2013.01); *B32B 18/00* (2013.01); *C04B 28/14* (2013.01); *E04C 2/043* (2013.01); *E04C 2/06* (2013.01); *E04C 2/30* (2013.01); *B32B 2419/06* (2013.01); *C04B 2111/00586* (2013.01); *E04C 2002/004* (2013.01); *Y10T 428/24777* (2015.01)

(58) Field of Classification Search
CPC .............. Y10T 428/24777; B32B 3/02; B32B 2419/06; E04C 2/043; E04C 2/30; E04C 2/06; E04C 2002/004
See application file for complete search history.

(56) References Cited

U.S. PATENT DOCUMENTS 2,871,134 A * 1/1959 Loechl .................... C04B 28/14
106/711
3,180,058 A 4/1965 Tillisch et al.
(Continued)

FOREIGN PATENT DOCUMENTS

DE 102008037077 A1 2/2010

OTHER PUBLICATIONS

International Search Report from corresponding International Patent Application No. PCT/US2018/024709, dated Jun. 20, 2018.

*Primary Examiner* — Alexander S Thomas
(74) *Attorney, Agent, or Firm* — Greer, Burns & Crain, Ltd.; Pradip Sahu; Philip T. Petti

(57) ABSTRACT

A gypsum fiber roofing panel with an angled edge for accommodating environmentally-induced expansion is provided, including a homogeneous body formed from a slurry of gypsum and reinforcing fibers having a face panel, a back panel, and a plurality of side edges, each side edge having an angle relative to a plane defined by the adjacent face panel in the range of 81-87° for accommodating environmentally-induced expansion relative to adjacent panels upon installation on a roof.

16 Claims, 4 Drawing Sheets

(51) Int. Cl.
 *E04C 2/00* (2006.01)
 *C04B 111/00* (2006.01)

(56) References Cited

U.S. PATENT DOCUMENTS

| | | | |
|---|---|---|---|
| 3,469,361 A | | 9/1969 | Winkowski |
| 4,195,110 A | * | 3/1980 | Dierks ................... B32B 13/02 |
| | | | 428/218 |
| 2003/0211305 A1 | | 11/2003 | Koval et al. |
| 2004/0065399 A1 | | 4/2004 | Conboy |
| 2011/0061316 A1 | | 3/2011 | Tonyan et al. |

* cited by examiner

GYPSUM FIBER ROOF PANEL WITH ANGLED EDGE FOR ACCOMMODATING ENVIRONMENTALLY-INDUCED EXPANSION

RELATED APPLICATION

This application claims 35 USC 119 priority from U.S. Provisional Application Ser. No. 62/478,865 filed Mar. 30, 2017, the contents of which are incorporated by reference herein.

BACKGROUND

The present invention relates to construction panels used in roofing applications, and more specifically to relatively thin roofing panels made of homogeneous gypsum fiber panels.

Gypsum-fiber roof panels are known in the art for use in low-slope roofing systems. A suitable example of such a panel is USG SECUROCK® Gypsum-Fiber Roof Board, manufactured by United States Gypsum Company, Chicago, Ill. These panels are provided in a variety of thicknesses, ranging from ¼-inch, ⅜-inch, ½-inch and ⅝-inch. The panels are homogeneous (meaning lacking face paper on both front and rear main panels), being made of a slurry of gypsum, reinforcing fibers of wood, carbon, glass, polyester, nylon and other materials, as well as other related additives that is placed and formed on a Fourdrinier machine, then pressed, allowed to set, dried in a kiln and cut to desired panel dimensions.

To enhance strength and handling performance characteristics, the relatively thin ¼-inch SECUROCK panels are formulated with a higher density than the relatively thicker panels. In some applications, when the ¼-inch panels are installed so that adjacent panels abut each other, it has been found that environmental temperature and/or moisture (hygrometric) conditions have caused the panels to expand, so that the joints or seams where adjacent panels abut experience an unwanted "ridging," where the edges of the panels turn upwards. One suspected factor in this ridging is the relatively greater density of the thinner SECUROCK panels. Conventional SECUROCK panels of greater thicknesses, have not experienced such ridging. It is believed that this is due to the relatively lower densities of these panels, which enable the adjacent panels to crush or compress into each other when subject to environmentally-induced expansion. This ridging phenomenon is considered unsightly, and is detrimental to the performance of the completed roof assembly.

To address the unwanted ridging, one proposed solution has been to install the SECUROCK panels on the roof with small gaps between adjacent panels to accommodate expansion. However, this practice is counter to the practice of trained roofing installers, who habitually abut new panels up against existing panels during installation. This spaced installation also is considered less desirable due to potential panel performance problems in the resulting roofing system.

Accordingly, there is a need for an improved, relatively thin gypsum fiber roof panel that addresses the above-listed problem.

SUMMARY

The above-identified drawback of conventional gypsum fiber roof panels, particularly relatively thin SECUROCK panels, and more particularly of such panels having a ¼-inch thickness, is addressed and solved by the present, improved SECUROCK roofing panel configuration. Specifically, rather than being provided with vertical edges oriented normally to the main panel upper and lower surfaces, the present panels feature an angled edge, preferably on all four sides. It has been found that when the present panels are installed so that the angled edges of adjacent panels are in contact with each other, when the panels are subject to environmental conditions causing expansion, the panels expand into each other, causing slight compression of the angled edges. Thus, the panels remain in contact during installation according to the traditional installation procedure, and the unwanted ridging is eliminated.

It is preferred that an angle created at the edge of the present panels be approximately 81 to 87° measured from an upper panel surface. More preferably, the angle is approximately 85°. Also, the benefits of the present angled edges are achieved as the roofing panel is relatively thinner and denser. It is contemplated that the present roofing panel have a thickness in the range of ½-inch to ¼-inch, and a density in the range of 50 to 85 pounds per cubic foot (pcf). It is especially preferred that the present roofing panel have a thickness of approximately ¼-inch and a density in the range of 64 to 80 pcf, and it is further preferred that the density of the present panel be approximately 77 pcf.

More specifically, an improved gypsum fiber roofing panel is provided, having an angled edge for accommodating environmentally-induced expansion, the panel including a homogeneous body formed from a slurry of gypsum and reinforcing fibers having a face panel, a back panel, and a plurality of side edges, each side edge having an angle relative to a plane defined by the adjacent face panel in the range of 81-87° for accommodating environmentally-induced expansion relative to adjacent panels upon installation on a roof.

In another embodiment, a gypsum fiber roofing panel, is provided and includes a homogeneous body formed from a slurry of gypsum and reinforcing fibers having a face panel, a back panel, and a plurality of side edges, the panel having a thickness of approximately ¼-inch and a density of approximately 77 pcf. Each side edge defining an angle relative to a plane defined by said adjacent face panel of approximately 85° for accommodating environmentally-induced expansion relative to adjacent panels upon installation on a roof.

DETAILED DESCRIPTION

Figure 1:
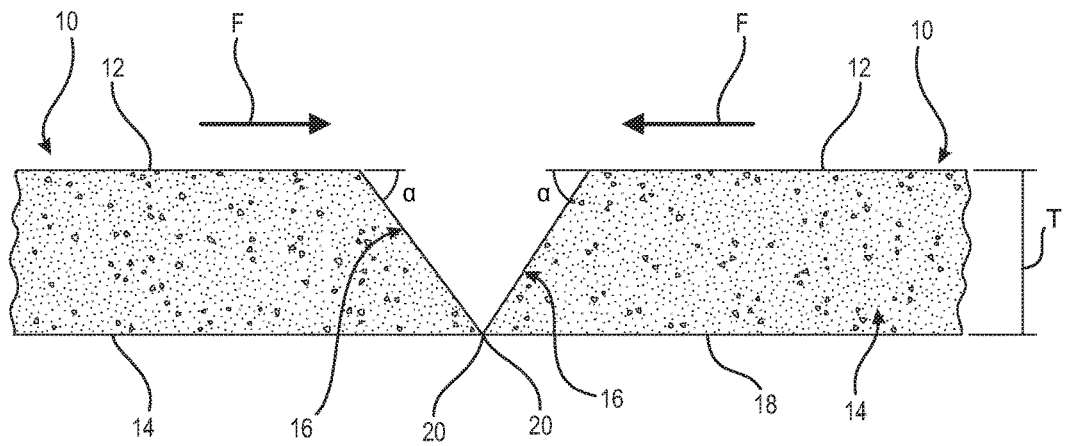
FIG. 1 is a schematic fragmentary vertical cross-section of two adjacent panels incorporating the present invention in an installed position.

Referring now to FIGS. 1-4, the present gypsum fiber roofing panel is generally designated 10 and includes an upper surface or face panel 12, and opposite lower surface or back panel 14 and at least one and preferably four side edges 16. As described above, the panels 10 are known in the art for use in low-slope roofing systems. A suitable example of such a panel 10 is USG SECUROCK® Gypsum-Fiber Roof Board, manufactured by United States Gypsum Company, Chicago, Ill. These panels 10 are provided in a variety of thicknesses, ranging from ¼-inch, ⅜-inch, ½-inch and ⅝-inch. The panels 10 are homogeneous (meaning lacking face paper on both front and rear main panels), being made of a slurry of gypsum, reinforcing fibers of wood, carbon, glass, polyester, nylon and other materials, as well as other related additives that is placed and formed on a Fourdrinier machine, then pressed, allowed to set, dried in a kiln and cut to desired panel dimensions.

A main feature of the present panel 10 is that at least one and preferably all four side edges 16, is provided with an angle α defined relative to a plane defined by the adjacent face panel 12 in the range of 81-87°. In a preferred embodiment, the angle α is 85°. Another way of characterizing the angle α is that it is between 3 and 9° from a vertical edge or a normal or 90° edge of a standard, conventional gypsum fiber roofing panel. It has been found that by providing the angle α, the panel 10 has an improved capacity for accommodating environmentally-induced expansion relative to adjacent panels upon installation on a roof. It should be noted that FIGS. 1-4 are schematic, and that the angle α may appear larger in the drawings than in the actual board to emphasize the angular nature of the edge profile.

In a preferred embodiment of the panel 10, the panel has a thickness "T" that ranges from ¼ inch to ½ inch, and more particularly is preferred to be ¼ inch. In addition, the panel 10 has a preferred density in the range of 50-85 pcf, and it is further preferred that the panel has a density in the range of 64 to 80 pcf. It is especially preferred that the panel 10 has a density of approximately 77 pcf. In the present application, "approximately" will be understood to mean that the stated value may vary ±10%.

Figure 2:
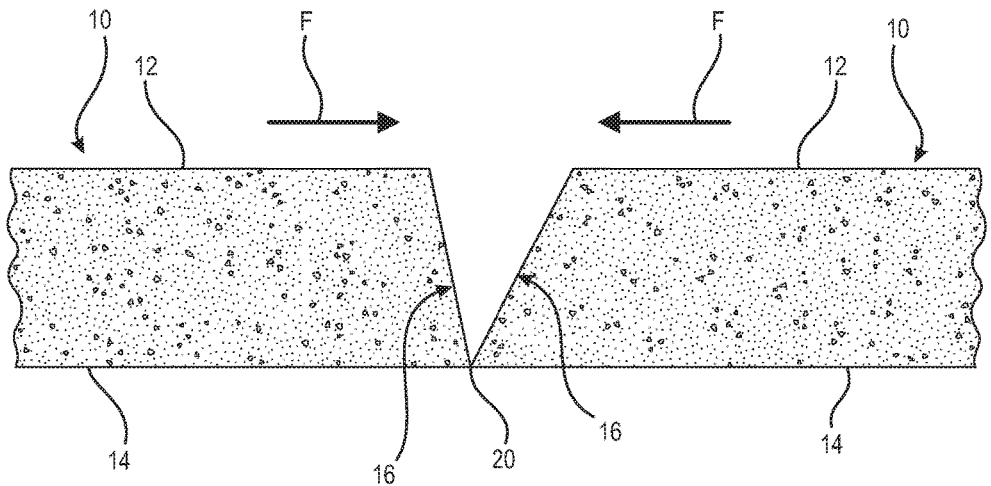
FIG. 2 is a schematic fragmentary vertical cross-section of the panels of FIG. 1 in a first stage of expansion.

FIG. 1 represents a pair of the panels 10 mounted on a roof schematically shown at 18 in adjacent, abutting relationship, so that points 20 of the angled edges 16 are in contact with each other. Referring now to FIG. 2, due to environmental factors, including a combination of temperature and/or humidity, as known in the art, the adjacent panels 10 are caused to expand, so that expansion forces represented by the arrows 'F' are created. As such, the structure of the panels 10 is such that the edges 16 begin to collapse against each other.

Figure 3:
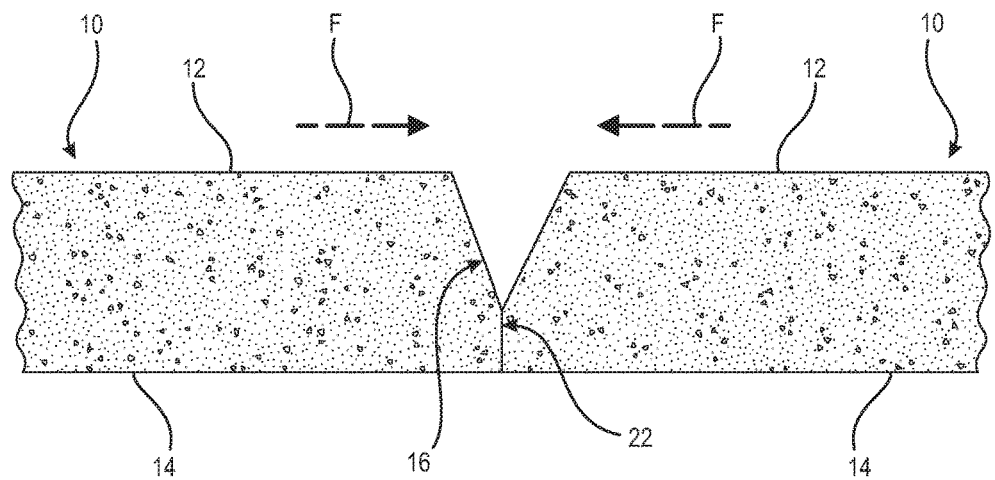
FIG. 3 is a schematic fragmentary vertical cross-section of the panels of FIG. 1 in a second stage of expansion.

Referring now to FIG. 3, further expansion causes the points 20 to completely collapse as the abutting surface area 22 of the adjacent panels 10 increases. Lastly, at FIG. 4, at full expansion, the edge 16 is constructed and arranged so that the angle α has collapsed to the point where it is no longer visible, and the surface area 22 of the adjacent edges 16 approximates that of the thickness "T". It is important to note that the expansion of the panels 10 has been accommodated without the unwanted "ridging" that was encountered in the relatively high density, relatively thin conventional gypsum fiber roofing panels. The construction of the present panel 10 has been shown to allow abutting installation of the panels on a roof, and accommodating conventional amounts of environmentally-induced expansion, without causing the unwanted ridging.

Figure 5:
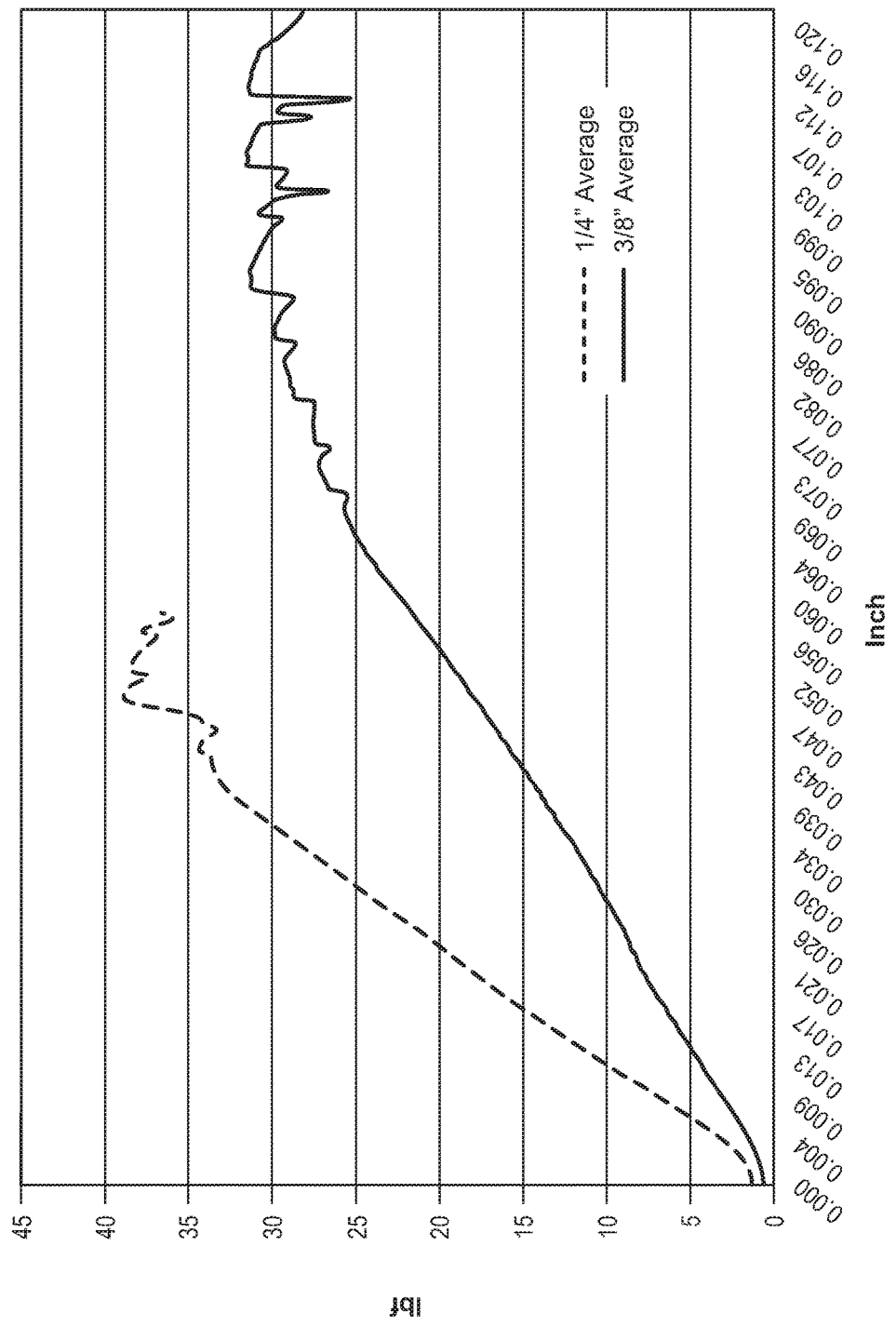
FIG. 5 is a graphic representation of the expansion and loading properties of prior art gypsum fiber roofing panels.
Figure 6:
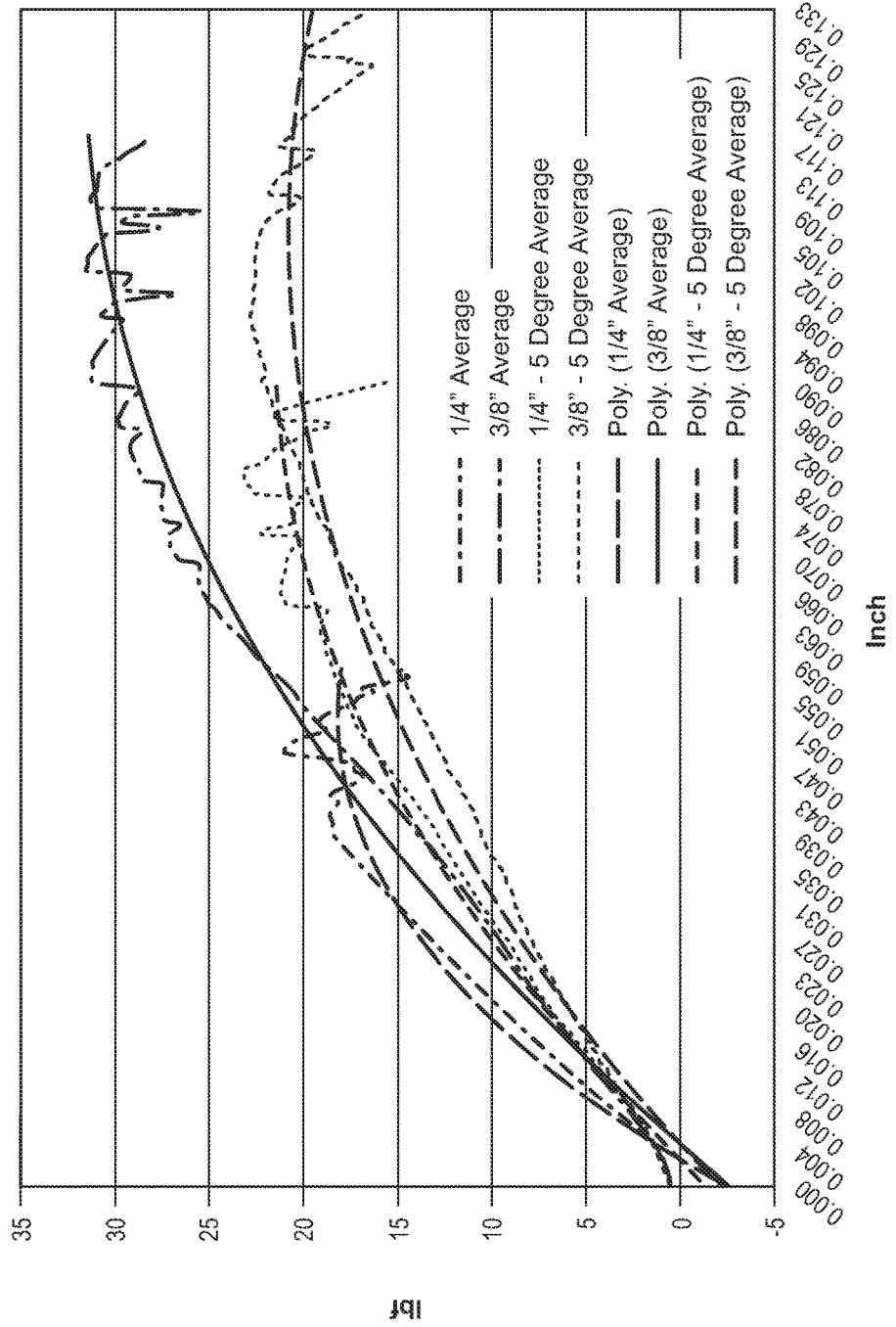
FIG. 6 is a graphic representation of the expansion and loading properties of the present gypsum fiber roofing panels.

Referring now to FIGS. 5 and 6, tests were conducted of sample panels mounted on a compression load testing device. Suitable testing devices are manufactured by Applied Test Systems, Butler, Pa., USA. In the test, a pair of sample panels cut to 1-inch by 6.5 inches, were placed in abutting relationship along the 6-inch side, and compressive load forces are gradually applied to each panel, simulating the environmentally-induced expansion that is experienced by conventional gypsum fiber roof panels upon installation.

More specifically, the test device was programmed to compress the two specimens together at a rate of 0.5 inch per minute. The tests were conducted at 70° F. and 55% relative humidity, as well as at 90° F. and 90% relative humidity. The test loading data for each test panel was averaged to create the plot lines shown in FIGS. 5 and 6. It should be noted, when reviewing FIGS. 5 and 6, that the lighter lines represent the actual data, and the bolder lines represent the average of the data.

Referring now to FIG. 5, comparison of conventional (non-angled) edge panels reveals that ¼-inch panels having a density of approximately 77 pcf fully collapsed and actually ridged at approximately 18-20 pounds of force (Ibf) at a compressed distance of approximately 0.040 inch to 0.055 inch. In contrast, the ⅜-inch panel, having a density of approximately 63 pcf, fully collapsed at approximately 28-30 Ibf at a compressed distance of 0.078 inch to 0.090 inch. Thus, the relatively lower density, thicker ⅜-inch panels accommodated greater amounts of expansion before collapsing or ridging, which is believed to be due to the material crushing upon itself under compression/expansion. In other words, the thinner, ¼-inch panels ridged upwards at a significantly shorter distances than the relatively thicker panels. This test supports results noted in the field, where the relatively thicker panels did not experience ridging under normal environmental conditions.

Referring now to FIG. 6, plots are shown of test results of opposing, compressed samples of the present panel 10 with the angled edges 16 at a ¼-inch thickness and an approximate density of 77 pcf, compared with the prior ⅜-inch panel having squared or 90° edges. Compared with the data of FIG. 5, duplicated here, the angled edge panel 10 withstands approximately 20-22 Ibf before totally collapsing, at a distance of 0.074 to 0.090 inch. Thus, in some cases, the accommodated expansion approximately doubled as a result of the angled edge 16. In FIG. 6, data is also plotted when ⅜-inch panels were provided with the angled edges 16. As is seen, the plot of the ⅜ inch panels closely follows that of the angled-edge ¼-inch panels 10.

Figure 4:
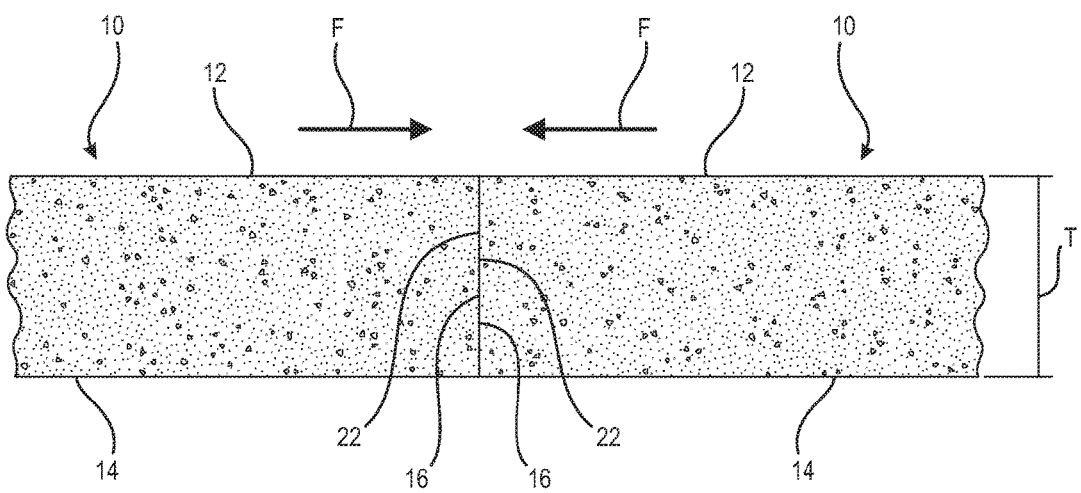
FIG. 4 is a schematic fragmentary vertical cross-section of the panels of FIG. 1 in a third stage of expansion.

Further analysis of the test samples revealed that the angle α creates a gap of approximately 3/64-inch at the face panel 12 of adjacent panels 10 of ¼-inch thickness, and a gap of approximately 1/16-inch at the face panel 12 of ⅜-inch thick panels. Upon full compression/expansion of the panels 10 as seen in FIG. 4, there is a slight breakdown of the panels in a small area along the common surface 22 that creates a slight lift of the panels, approximately in the range of 1/32 to 3/64-inch which is not considered problematic by roofing applicators. Upon comparing the data generated in the above-described compression tests, the angled edge a allowed greater movement of the panels 10 after compression/expansion, in the range of 35% for ¼-inch panels, and 22.5% for ⅜-inch panels. Best results were obtained when the panel 10 has a ¼-inch thickness, a density of 77 pcf and the edge 16 has an angle α of 85°.

While a particular embodiment of the present gypsum fiber roofing panel with an angled edge for accommodating environmentally-induced expansion has been described herein, it will be appreciated by those skilled in the art that changes and modifications may be made thereto without departing from the invention in its broader aspects and as set forth in the following claims.

The invention claimed is:

1. A gypsum fiber roofing panel, comprising:
   a homogeneous body formed from a slurry of gypsum and reinforcing fibers having a face panel, a back panel, and a plurality of side edges;
   each said side edge having an angle extending from said face panel to said back panel relative to a plane defined by n adjacent said face panel in the range of 81-87° for accommodating environmentally-induced expansion relative to adjacent panels upon installation on a roof.

2. The roofing panel of claim 1, wherein each of four sides of said panel have said angled side edges.

3. The roofing panel of claim 1, wherein said angle of said side edge measured relative to a plane defined by the adjacent face panel is 85°.

4. The roofing panel of claim 1, wherein said panel has a thickness in the range of ¼-inch to ½-inch.

5. The roofing panel of claim 4 wherein said panel has a density of approximately 77 pcf.

6. The roofing panel of claim 1, wherein said panel has a density in the range of 50-85 pcf.

7. The roofing panel of claim 1, wherein said panel has a density in the range of 64 to 80 pcf.

8. A gypsum fiber roofing panel, comprising:
   a homogeneous body formed from a slurry of gypsum and reinforcing fibers having a face panel, a back panel, and a plurality of side edges, said panel having a thickness of approximately ¼-inch and a density of approximately 77 pcf; and
   each said side edge having an angle extending from said face panel to said back panel relative to a plane defined by an adjacent said face panel of approximately 85° and forming a point adjacent said back panel for accommodating environmentally-induced expansion relative to adjacent panels upon installation on a roof.

9. A pair of gypsum fiber roofing panels used to form a roof, comprising:
   each said panel having a homogeneous body formed from a slurry of gypsum and reinforcing fibers having a face panel, a back panel, and a plurality of side edges;
   each said side edge having an angle extending from said face panel to said back panel relative to a plane defined by an adjacent said face panel in the range of 81-87°, each said side edge forming a point;
   upon assembly of said panels adjacent each other, said side edges contact each other at said point of each said panel;
   said panels being constructed and arranged so that said angled edges of said adjacent panels collapse to form a generally vertical edge for accommodating environmentally-induced expansion relative to adjacent panels upon installation on the roof.

10. The pair of roofing panels of claim 9, wherein in each said panel, each of four sides of said panel have said angled side edges.

11. The pair of roofing panels of claim 9, wherein each said panel has a thickness in the range of ¼-inch to ½-inch.

12. The pair of roofing panels of claim 9, wherein each said panel has a density in the range of 50-85 pcf.

13. The pair of roofing panels of claim 12 wherein each said panel has a density of approximately 77 pcf.

14. The pair of roofing panels of claim 9, wherein each said panel has a density in the range of 64 to 80 pcf.

15. The pair of roofing panels of claim 9, wherein each said panel has a thickness of ¼-inch, a density of approximately 77 pcf and said adjacent side edges compress approximately 0.040 inch to 0.055 inch under 18-20 pounds of force.

16. The pair of roofing panels of claim 9, wherein each said panel has a thickness of ⅜-inch, a density of approximately 63 pcf and said adjacent side edges compress approximately 0.078 inch to 0.090 inch under 28-30 pounds of force.

* * * * *